United States Patent
Okamura et al.

(10) Patent No.: US 8,093,843 B2
(45) Date of Patent: Jan. 10, 2012

(54) VEHICLE CONTROLLER AND CONTROL METHOD

(75) Inventors: Masaki Okamura, Toyota (JP); Hideto Hanada, Toyota (JP); Masayoshi Suhama, Toyota (JP); Yuki Sugiyama, Nishio (JP); Ken Iwatsuki, Anjo (JP)

(73) Assignees: Toyota Jidosha Kabushiki Kaisha, Toyota (JP); Aisin Aw Co., Ltd., Anjo (JP)

( * ) Notice: Subject to any disclaimer, the term of this patent is extended or adjusted under 35 U.S.C. 154(b) by 428 days.

(21) Appl. No.: 12/312,605

(22) PCT Filed: May 19, 2008

(86) PCT No.: PCT/JP2008/059600
§ 371 (c)(1),
(2), (4) Date: May 19, 2009

(87) PCT Pub. No.: WO2008/146762
PCT Pub. Date: Dec. 4, 2008

(65) Prior Publication Data
US 2010/0052588 A1 Mar. 4, 2010

(30) Foreign Application Priority Data
May 30, 2007 (JP) .................................. 2007-143567

(51) Int. Cl.
*H02P 1/00* (2006.01)
(52) U.S. Cl. ........................................ 318/139; 318/800
(58) Field of Classification Search .................. 318/139, 318/798, 799, 800, 432, 434
See application file for complete search history.

(56) References Cited

U.S. PATENT DOCUMENTS

| 5,186,081 A | * | 2/1993 | Richardson et al. ............. 477/33 |
| 5,261,236 A | * | 11/1993 | Ironside et al. .................. 60/600 |
| 5,887,670 A | * | 3/1999 | Tabata et al. ................ 180/65.25 |
| 6,338,391 B1 | * | 1/2002 | Severinsky et al. ........ 180/65.23 |

FOREIGN PATENT DOCUMENTS

| JP | A-05-130709 | 5/1993 |
| JP | A-09-046810 | 2/1997 |
| JP | A-10-248104 | 9/1998 |
| JP | A-10-248106 | 9/1998 |
| JP | A-11-205914 | 7/1999 |
| JP | A-2001-211511 | 8/2001 |
| JP | A-2005-073328 | 3/2005 |
| JP | A-2006-151039 | 6/2006 |

OTHER PUBLICATIONS

Decision to Grant issued in Japanese Application No. 2007-143567 dated May 10, 2011 (with translation).

* cited by examiner

*Primary Examiner* — Rina Duda
(74) *Attorney, Agent, or Firm* — Oliff & Berridge, PLC

(57) ABSTRACT

By the vehicle controller of the present invention, when the economy mode is selected by a driver, boosting by a converter is limited and output torque of a motor is limited. Even in the economy mode, however, if the driver requests large torque, either the limit on boosting or the limit on output torque is cancelled. As a result, a vehicle controller for a vehicle including a battery, a converter boosting/lowering the battery voltage and a motor operating with the power from the converter is provided, by which unnecessary power consumption is reduced and the torque requested by the driver can be generated.

14 Claims, 10 Drawing Sheets

F I G. 8
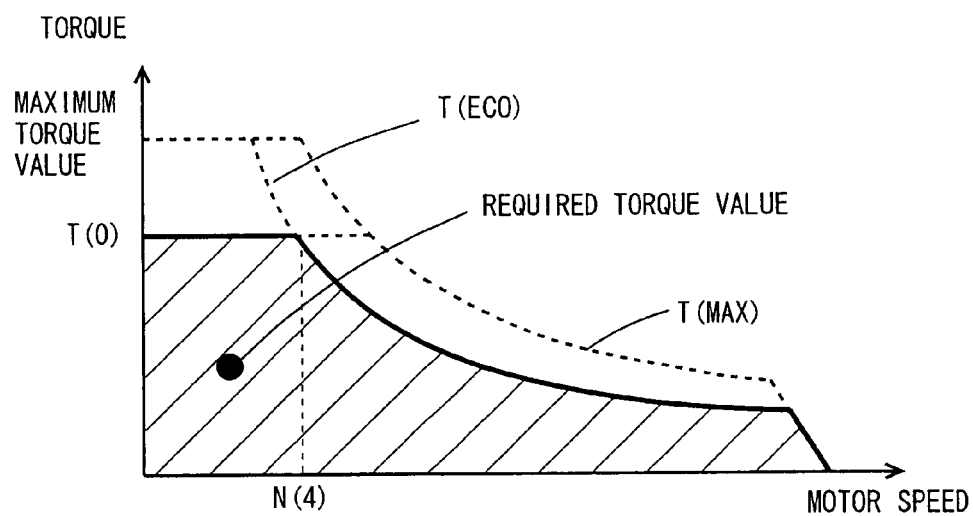

VEHICLE CONTROLLER AND CONTROL METHOD

TECHNICAL FIELD

The present invention relates to vehicle control and, more specifically, to control of a vehicle including a power storage mechanism, a converter boosting/lowering the electric power of the power storage mechanism, and a rotating electric machine that operates with the electric power from the converter.

BACKGROUND ART

Recently, an electric vehicle of which wheels are driven by an electric motor using a battery as a power source has been put to practical use. For an electric vehicle, there is a demand of increasing running distance as much as possible with a battery of a limited capacity, while ensuring necessary running performance. To meet such a demand, an electric vehicle has been proposed in which a normal mode and an economy mode, in which output is limited to attain higher economic efficiency than in the normal mode, can be selected manually or automatically, reflecting the intension of the driver. When the vehicle comes to run up-hill while the economy mode is selected, the output could be insufficient, resulting in difficulty in up-hill driving. A solution to such a problem is disclosed, for example, in Japanese Patent Laying-Open No. 11-205914.

An output controller for an electric vehicle disclosed in Japanese Patent Laying-Open No. 11-205914 includes: a selecting unit for selecting either a power mode, which is a driving method focused on the driving performance, and an economy mode, which is a driving method focusing on economic efficiency; a detecting unit detecting that the vehicle is running up-hill; a limiting unit limiting the maximum allowable current value when the economy mode is selected to an economy maximum allowable current value smaller than the maximum allowable current value when the power mode is selected; and a correcting unit for correcting the economy maximum allowable current value to a larger side if it is detected that the vehicle is running up-hill while the economy mode is selected.

According to the output controller disclosed in Japanese Patent Laying-Open No. 11-205914, when the economy mode is selected, the maximum allowable current value is limited to a smaller value than when the power mode is selected, and therefore, running focused on economic efficiency becomes possible, and the possible running distance can be increased. If it is detected that the vehicle is running up-hill while the economy mode is selected, the economy maximum allowable current value is corrected to the maximum allowable current value when the power mode is selected and, therefore, maximum output can be generated for running up-hill, and hence, there is no difficulty in up-hill climbing.

In an electric vehicle with a converter for boosting battery power and supplying the resulting power to an electric motor, possible output torque of the electric motor differs dependent on the boost voltage value provided by the converter. Therefore, it is possible to control driving force when the economy mode is selected, by controlling the boost voltage value of the converter. The structure of the electric vehicle disclosed in Japanese Patent Laying-Open No. 11-205914 does not include a converter and, therefore, it is silent about driving force control considering the boost voltage value of the converter.

DISCLOSURE OF THE INVENTION

The present invention was made to solve the above-described problem, and its object is to provide, in a vehicle including a converter for boosting/lowering electric power of a power storage mechanism and a rotating electric machine that operates with the electric power from the converter, a controller and a control method that can generate driving force as requested by the driver, while reducing unnecessary power consumption.

According to an aspect, the present invention provides a controller for a vehicle including a power storage mechanism, a converter boosting/lowering electric power from the power storage mechanism, and a rotating electric machine that operates with the electric power from the converter. The controller includes: a detecting unit for detecting which operation mode of a normal mode and an economy mode is selected by a driver of the vehicle; and a control unit. The control unit limits boosting by the converter and limits output torque of the rotating electric machine, when selection of the economy mode is detected by the detecting unit, calculates a required torque value of the rotating electric machine, and based on the required torque value, cancels at least one of the limit on boosting and the limit on the output torque.

According to the present invention, when the economy mode is selected by the driver, boosting by the converter is limited and output torque of the rotating electric machine is limited. Therefore, power consumption is reduced as the torque is limited, and the loss both by the converter and the rotating electric machine can be reduced. Even when the economy mode is selected, the driver may request large torque dependent on the state of running. Therefore, the required toque value of the rotating electric machine is calculated, and at least one of the limit on boosting and limit on output torque is cancelled. As a result, it becomes possible to have the rotating electric machine output the required torque value while one of the limit on boosting and limit on torque is cancelled and the other maintained. Specifically, it becomes possible to output the required torque value while the loss by the converter or the loss by the rotating electric machine is reduced. Thus, the driving force requested by the driver can be generated while unnecessary power consumption is reduced. As a result, in a vehicle including a converter for boosting/lowering electric power of a power storage mechanism and a rotating electric machine that operates with the electric power from the converter, a controller that can generate driving force as requested by the driver while reducing unnecessary power consumption can be provided.

Preferably, the controller further includes a speed detecting unit for detecting speed of the rotating electric machine. The control unit cancels at least one of the limits, based on the speed detected by the speed detecting unit, in addition to the required torque value.

According to the present invention, the possible output torque value of the rotating electric machine increases as the boost voltage value of the converter becomes higher and, in a high speed range, tends to be smaller as the speed increases. Therefore, at least either one of the limits is cancelled based on the speed of rotating electric machine, in addition to the required torque value. By way of example, if the required toque value is larger than the limit value of output torque, at least the limit on output torque is cancelled, and if the required torque value is larger than the possible output torque value when the boosting is limited, calculated based on the speed of rotating electric machine, at least the limit on boosting is cancelled. Thus, in accordance with the required torque value and the output characteristic of the rotating electric machine, either limit can be cancelled appropriately. Therefore, reduction of unnecessary power consumption and output of required torque value can both be realized.

More preferably, the control unit determines whether or not the required torque value is larger than a threshold value, calculates a possible output torque of the rotating electric machine when the boosting is limited, based on the detected speed, determines whether or not the required torque value is larger than the possible output torque value, and based on a result of determination as to whether the required torque value is larger than the threshold value and on a result of determination as to whether the required torque value is larger than the possible output torque value, cancels at least one of the limits.

According to the present invention, whether the required torque value is larger than a threshold value (limit value of output torque) or not is determined. Whether or not the required torque value is larger than the possible output torque value of rotating electric machine when the boosting is limited is determined. Either of the limits is cancelled based on the results of determination. Thus, either of the limits can be cancelled appropriately in accordance with the required torque value. By way of example, if the required torque value is larger than the threshold value and smaller than the possible output torque value, the limit on output torque can be cancelled while the limit on boosting is maintained. Further, if the required torque value is smaller than the torque value and larger than the possible output torque value, the limit on boosting can be cancelled while the limit on the output torque is maintained. Accordingly, either of the limits can be cancelled appropriately in accordance with the required torque value and the output characteristic of the rotating electric machine.

More preferably, the control unit cancels the limit on the output torque while maintaining the limit on boosting, if a state in which the required torque value is larger than the threshold value and smaller than the possible output torque value continues for a prescribed time period.

According to the present invention, when the state in which the required torque value is larger than the threshold value and smaller than the possible output torque value continues for more than a prescribed time period, it is determined that the driver requests larger torque and, the limit on the output torque is cancelled, while the limit on boosting is maintained. Thus, the torque exceeding the possible output torque value is prevented and the loss by the converter is reduced, while the rotating electric machine outputs the torque requested by the driver.

More preferably, the control unit stops cancellation of the limit on the output torque and resumes the limit on the output torque, if the required torque value becomes smaller than the threshold value while the limit on the output torque has been cancelled.

According to the present invention, when the required torque value becomes smaller than the threshold value, it is determined that the driver does not request large torque and, the cancellation of output torque limit is immediately stopped. Thus, unnecessary power consumption can be reduced.

More preferably, the control unit cancels the limit on boosting while maintaining the limit on the output torque, if a state in which the required torque value is smaller than the threshold value and larger than the possible output torque value continues for a prescribed time period.

According to the present invention, when a state in which the required torque value is smaller than the threshold value and larger than the possible output torque value continues for more than a prescribed time period, it is determined that the driver requests large torque, and the limit on boosting is cancelled while the limit on output torque is maintained. Thus, the torque exceeding the threshold value is prevented and the loss by the rotating electric machine is reduced, while the rotating electric machine outputs the torque requested by the driver.

More preferably, the control unit stops cancellation of the limit on boosting and resumes the limit on boosting, if the required torque value becomes smaller than the possible output torque value while the limit on boosting has been cancelled.

According to the present invention, when the required torque value becomes smaller than the possible output torque value while the limit on boosting is cancelled, it is determined that the driver does not request large torque and, the cancellation of boosting limit is immediately stopped. Thus, unnecessary power consumption can be reduced.

BRIEF DESCRIPTION OF THE DRAWINGS

FIGS. 8 to 11 represent the motor output torque limited by the ECU as the controller in accordance with the embodiment of the present invention.

BEST MODES FOR CARRYING OUT THE INVENTION

Figure 1:
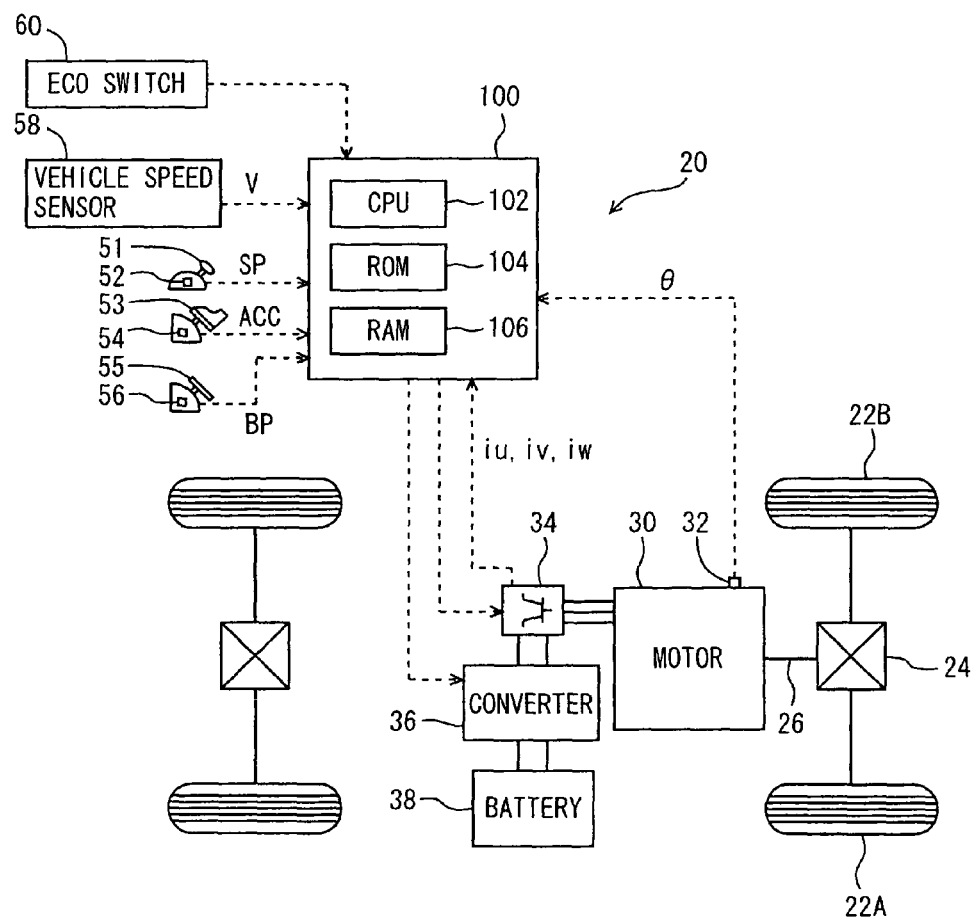
FIG. 1 shows a configuration of a vehicle on which the controller in accordance with an embodiment of the present invention is mounted.

In the following, embodiments of the present invention will be described with reference to the figures. In the following description, the same components are denoted by the same reference characters. Their names and functions are also the same. Therefore, detailed description thereof will not be repeated.

Referring to FIG. 1, the configuration of an electric vehicle 20, on which the controller in accordance with the present embodiment is mounted, will be described. The vehicle to which the controller of the invention is applicable is not limited to electric vehicle 20 shown in FIG. 1, and it may be an electric vehicle of a different type. Further, the vehicle may not be an electric vehicle but a hybrid vehicle that runs with power from an engine and a motor.

Electric vehicle 20 includes driving wheels 22A and 22B, a drive shaft 26 connected to driving wheels 22A and 22B through a differential gear 24, a motor 30 for running, outputting power for driving the wheels to drive shaft 26, an inverter 34, a converter 36, a battery 38 for running, and an electronic control unit (ECU) 100 for overall control of electric vehicle 20.

Motor 30 is formed, for example, as a well-known permanent magnet (PM) type synchronous generator motor, and it is driven by three-phase AC power from inverter 34.

Inverter 34 is provided between motor 30 and battery 38. Inverter 34 is formed as a well-known inverter circuit having six switching elements, and it converts DC power from battery 38 to quasi three-phase AC power by, for example, PWM (Pulse Width Modulation) control, and supplies it to motor 30.

Converter 36 is provided between inverter 34 and battery 38. When electric vehicle 20 is accelerated, rated voltage of battery 38 is boosted by converter 36, and supplied to inverter 34. At the time of regenerative braking of electric vehicle 20, the regenerated power converted to DC voltage by inverter 34 is lowered by converter 36, and supplied to battery 38.

Battery 38 is formed by connecting in series a plurality of modules, which in turn are formed by connecting in series a plurality of cells. Battery 20 discharges to converter 36 when electric vehicle 20 accelerates, and is charged from converter 36 at the time of regenerative braking of electric vehicle 20.

ECU 100 is formed as a microprocessor having a CPU (Central Processing Unit) 102 as a main component, and in addition to CPU 102, it includes an ROM (Read Only Memory) 104 storing a processing program, an RAM (Random Access Memory) 106 as a volatile memory temporarily storing data, and an input/output port, not shown.

To ECU 100, a detection signal 0 from a rotational position detection sensor 32 detecting a rotational position of a rotor in motor 30, phase currents iu, iv and iw from current sensors, not shown, attached to respective phases of inverter 34, a shift position SP from a shift position sensor 52 detecting an operational position of a shift lever 51, an accelerator pedal position ACC from an accelerator position sensor 54 detecting an amount of operation of an accelerator pedal 53, a brake pedal operation amount BP from a brake pedal position sensor 56 detecting an amount of operation of a brake pedal 55, vehicle speed V from a vehicle speed sensor 58 and the like are input through an input port.

Figure 2:
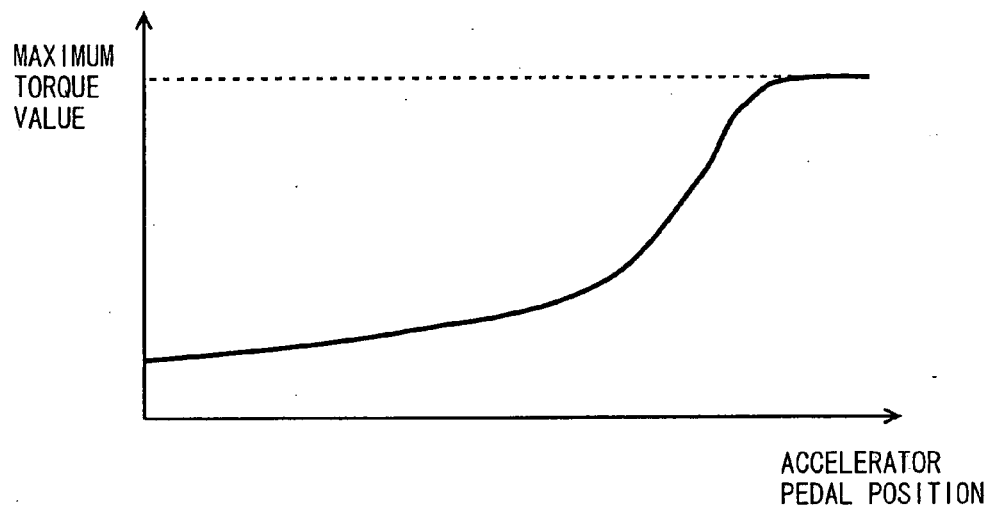
FIG. 2 shows a relation between an accelerator pedal position and a required torque value.

ECU 100 calculates a required torque value using, for example, a map having accelerator pedal position ACC as a parameter, such as shown in FIG. 2. In the map shown in FIG. 2, the required torque value is set larger as the accelerator pedal position ACC becomes larger, with the maximum torque value being the upper limit. The method of calculating the required torque value is not limited to the above. ECU 100 controls inverter 34 such that a current value that causes motor 30 to output the required torque value is supplied to motor 30.

Figure 3:
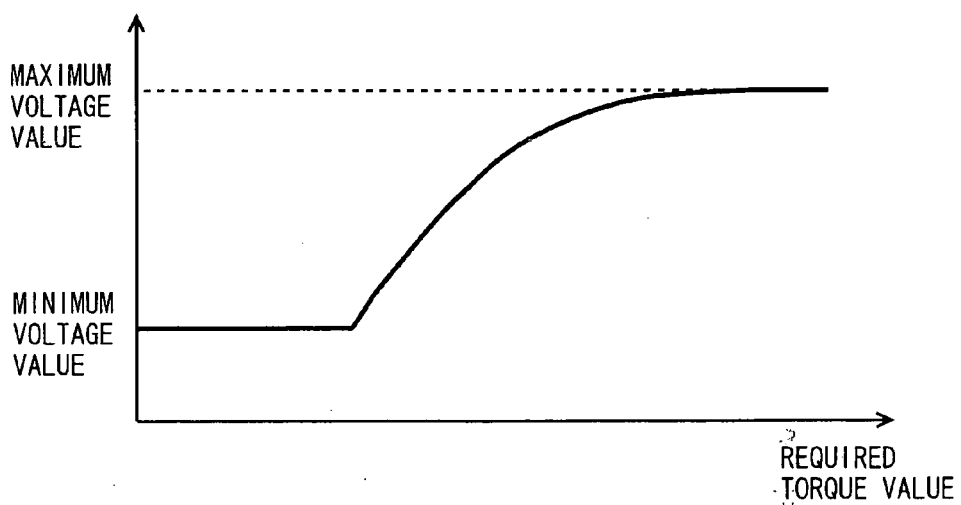
FIG. 3 shows a relation between the required torque value and a system voltage value.

Further, ECU 100 sets a voltage value after boosting by converter 36 (hereinafter also referred to as a system voltage value), using a map having the required torque value as a parameter, such as shown in FIG. 3. In the map shown in FIG. 3, the system voltage value is set to be larger as the required torque value becomes larger, with the minimum voltage value (that is, rated voltage of battery 38) being the lower limit and the maximum voltage value being the upper limit. The method of calculating the system voltage value is not limited to the above. ECU 100 controls converter 36 such that the set system voltage value is attained.

Further, to ECU 100, a signal from an eco switch 60 is input through the input port. Eco switch 60 allows the driver to select either a normal mode or an economy mode for running electric vehicle 20. When the eco switch 60 is on, eco switch 60 transmits a signal indicating that the driver is selecting the economy mode, to ECU 100. When eco switch 60 is off, eco switch 60 transmits a signal indicating that the driver is selecting the normal mode, to ECU 100.

Figure 4:
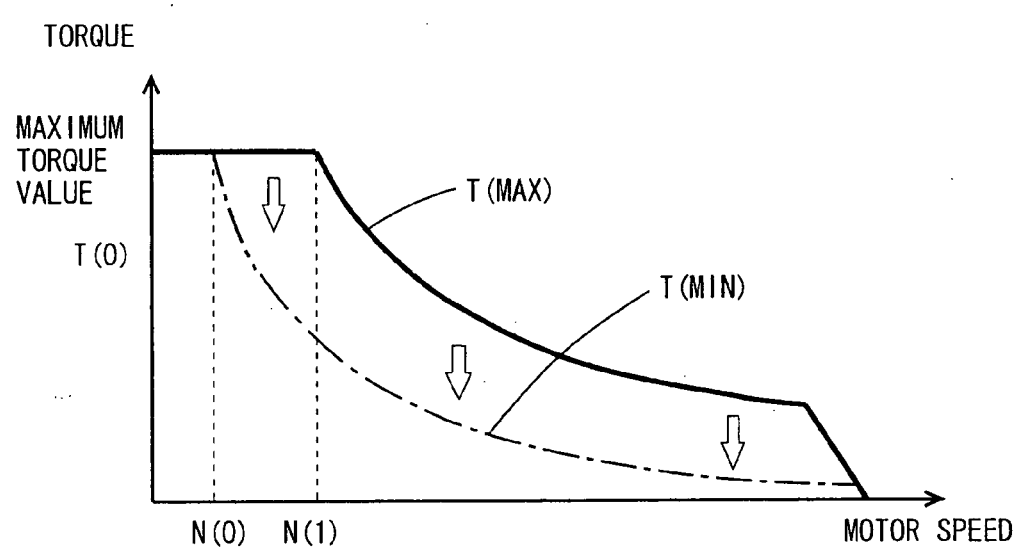
FIG. 4 shows relations of a motor speed, the system voltage value and a possible output torque value of the motor.

Referring to FIG. 4, the relation of the number of rotations of motor 30 (hereinafter also simply referred to as a motor speed), system voltage value and possible output torque value of motor 30 will be described.

The possible output torque value of motor 30 increases as the system voltage value becomes higher, and decreases as the motor speed becomes higher.

The possible output torque value T(MAX) when the system voltage value is the largest is given by the solid line of FIG. 4. While the motor speed is lower than N(1), the possible output torque value T(MAX) is constant at the maximum torque value, and when motor speed becomes higher than N(1), it decreases as the motor speed increases.

When the system voltage value lowers, the possible output torque value gradually lowers, and the possible output torque value T(MIN) when the system voltage value attains to the minimum value (that is, the rated voltage of battery 38) is as represented by the chain-dotted line of FIG. 4. While the motor speed is lower than N(0) (<N(1)), possible output torque value T(MIN) is the same as the possible output torque value T(MAX) and constant, and when the motor speed becomes higher than N(0), it decreases as the motor speed increases.

Figure 5:
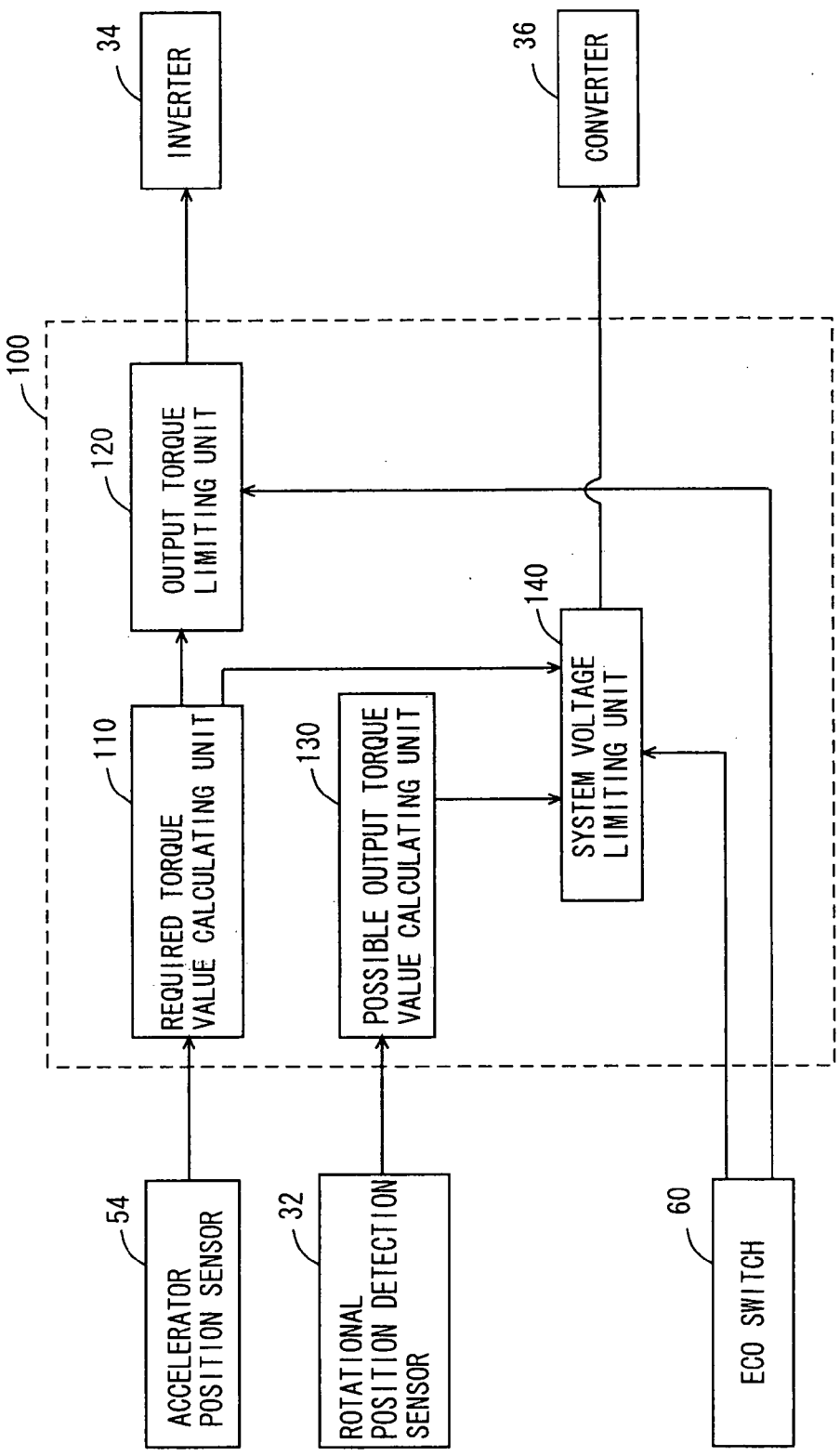
FIG. 5 is a functional block diagram of the controller in accordance with an embodiment of the present invention.

Referring to FIG. 5, the functional block diagram of the controller in accordance with the present embodiment will be described. As shown in FIG. 4, the controller includes a required torque value calculating unit 110, an output torque limiting unit 120, a possible output torque value calculating unit 130, and a system voltage limiting unit 140.

Required torque value calculating unit 110 calculates the required torque value based on the accelerator pedal position from accelerator position sensor 54.

Output torque limiting unit 120 transmits a control signal for controlling the output torque of motor 30 to inverter 34, based on the signal from eco switch 60 and the required torque value.

Possible output torque calculating unit 130 calculates a possible output torque value T(ECO) when the system voltage value is limited, based on the signal from rotational position detection sensor 32.

System voltage limiting unit 140 transmits a control signal limiting the system voltage, based on the signal from eco switch 60, the required torque value, and the possible output torque value T(ECO).

The controller in accordance with the present embodiment having such a functional block may be realized by hardware mainly formed of a digital or analog circuit structure, or by software mainly implemented by a program read from CPU 102 and ROM 104 included in ECU 100 and executed by CPU 102. Generally, hardware implementation is advantageous in view of speed of operation, while software implementation is advantageous in design change. In the following, the controller implemented by software will be described. It is noted that a recording medium recording such a program is also an implementation of the present invention.

Figure 6:
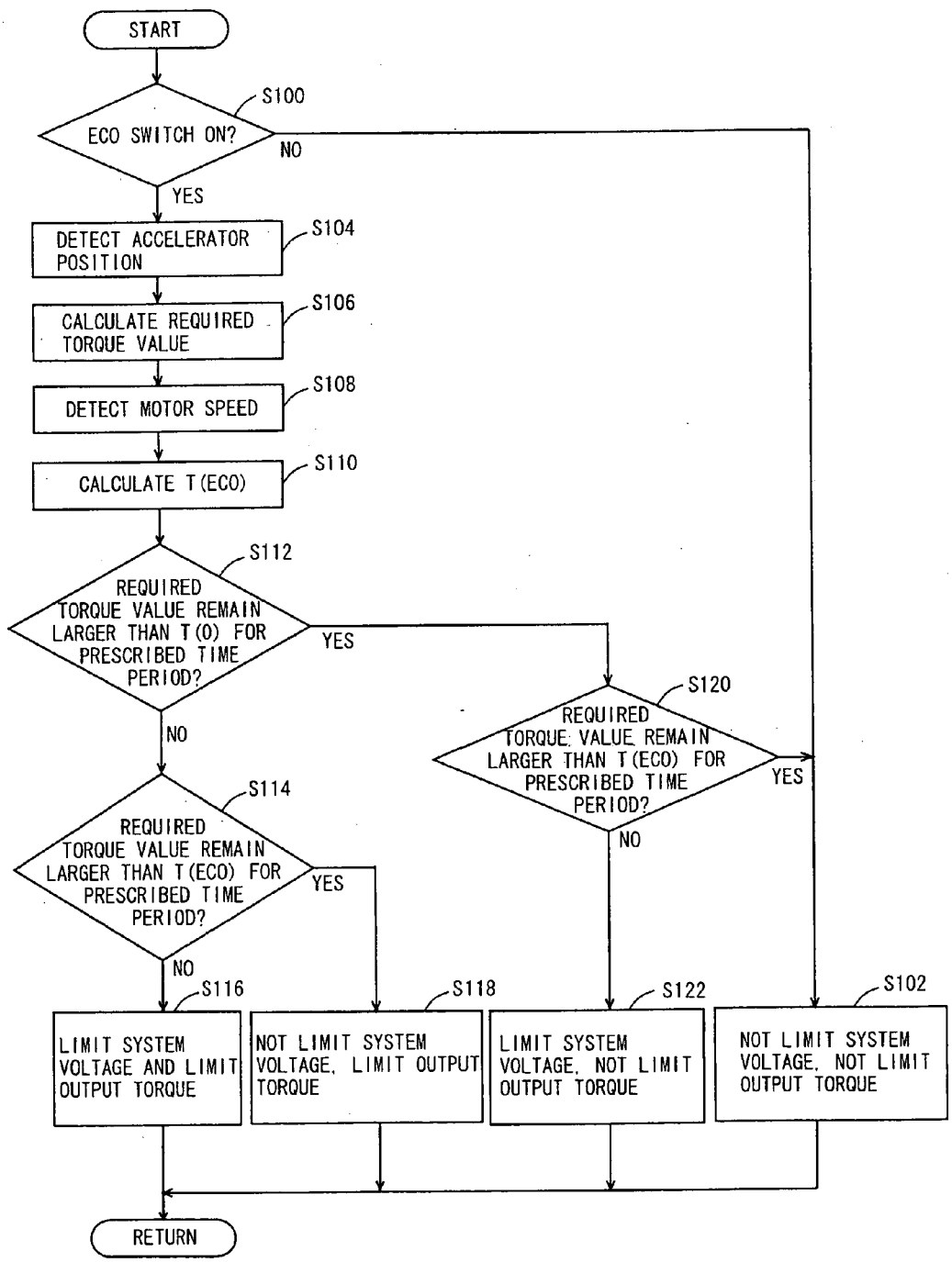
FIG. 6 is a flowchart representing a control structure of an ECU as the controller in accordance with the embodiment of the present invention.

Referring to FIG. 6, the control structure of the program executed by ECU 100 as the controller in accordance with the present embodiment will be described. The program is executed repeatedly with a predetermined cycle time.

At step (hereinafter denoted as S) 100, ECU 100 determines whether eco switch 60 is on or not, based on the signal from eco switch 60. If it is on (YES at S100), the process proceeds to S104. If not (NO at S100), the process proceeds to S102.

At S102, ECU 100 does not limit the system voltage value, and does not limit the output torque of motor 30.

At S104, ECU 100 detects the accelerator pedal position based on the signal from accelerator position sensor 54.

At S106, ECU 100 calculates the required torque value. By way of example, ECU 100 calculates the required torque value based on the accelerator pedal position and the map described above, shown in FIG. 2.

At S108, ECU 100 detects the motor speed based on the signal from rotational position detection sensor 32.

Figure 7:
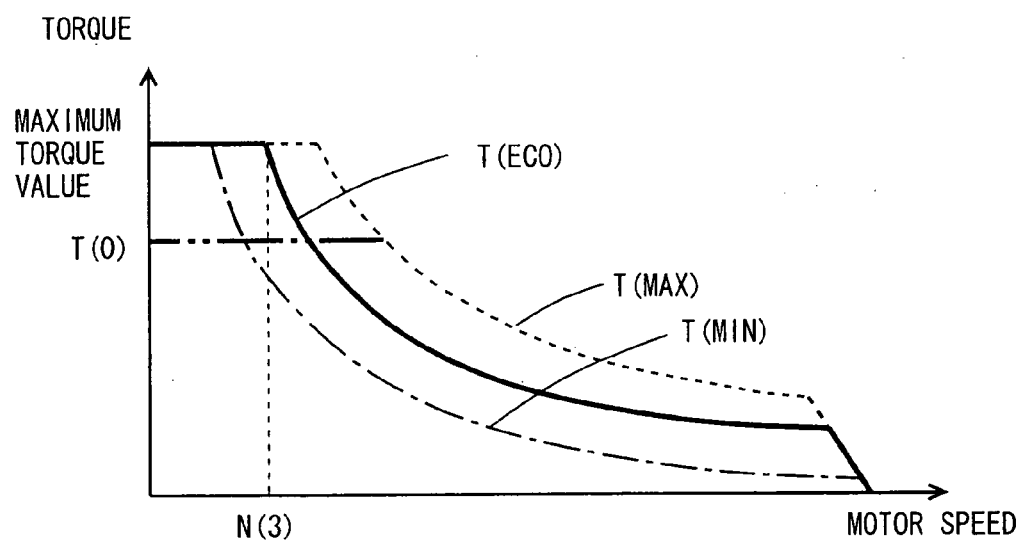
FIG. 7 shows a relation between the possible output torque value and the motor speed when the ECU as the controller in accordance with the embodiment of the present invention limits the system voltage value.

At S110, ECU 100 calculates the possible output torque value T(ECO) when the system voltage is limited. The possible output torque value T(ECO) represents the possible output torque value when the system voltage value is set to the limit voltage value V(0) (<maximum voltage value) in the economy mode. ECU 100 calculates the possible output torque value T(ECO) based on a map having the motor speed as a parameter, such as shown in FIG. 7. In the map shown in FIG. 7, the possible output torque T(ECO) is set to be constant at the maximum torque value while the motor speed is lower than N(3) (N(0)<N(3)<N(1)), and to decrease as the motor speed increases from N(3). The method of calculating the possible output torque T(ECO) is not limited to the above.

At S112, ECU 100 determines whether or not the required torque value remains larger than the limit torque value T(0) continuously for a prescribed time period. The limit torque value T(0) represents the limit value of output torque in the economy mode, which is a value smaller than the maximum torque value, as represented by a two-dotted line in FIG. 7. If the required torque value remains larger than the limit torque value T(0) continuously for a prescribed time period (YES at S112), the process proceeds to S120. If not (NO at S112), the process proceeds to S114.

At S114, ECU 100 determines whether the required torque value remains larger than the possible output torque value T(ECO) continuously for a prescribed time period or not. If the required torque value remains larger than the possible output torque value T(ECO) with the system voltage limited continuously for a prescribed time period (YES at S114), the process proceeds to S118. If not (NO at S114), the process proceeds to S116.

At S116, ECU 100 limits the system voltage and limits the output torque. Specifically, ECU 100 sets the upper limit of system voltage to the limit voltage value V(0), and sets the upper limit of output torque to the limit torque value T(0).

At S118, ECU 100 does not limit the system voltage but limits the output torque. Specifically, ECU 100 does not set the upper limit of system voltage, while it sets the upper limit of output torque to the limit torque value T(0).

At S120, ECU 100 determines whether the required torque value remains larger than the possible output torque value T(ECO) continuously for a prescribed time period or not. If the required torque value remains larger than the possible output torque value T(ECO) continuously for the prescribed time period (YES at S120), the process proceeds to S102. If not (NO at S120), the process proceeds to S122.

At S122, ECU 100 limits the system voltage, and it does not limit the output torque. Specifically, ECU 100 sets the upper limit of system voltage to limit voltage V(0), and does not set the upper limit of output torque.

The output torque of motor 30 controlled by ECU 100 as the controller in accordance with the present embodiment, based on the structure and flowchart as above, will be described in the following.

When eco switch 60 is on (YES at S100), accelerator pedal position is detected (S104), and the required torque value is calculated (S106). The motor speed is detected (S108), and the possible output torque value T(ECO) with the system voltage limited, is calculated (S110).

Unless the required torque value remains larger continuously (NO at S112, NO at S114), the upper limit of system voltage is set to the limit voltage value V(0) and the upper limit of output torque is set to the limit torque value T(0), in the economy mode (S116). The output torque at this time is limited both by the possible output torque value T(ECO) and the limit torque value T(0). Specifically, as shown in FIG. 8, the output torque is limited to limit torque value T(0) when the motor speed is lower than N(4) (>N(3)), and limited to the possible output torque value T(ECO) when the motor speed is higher than N(4). Consequently, excessive torque of motor 30 can be prevented and the system loss by motor 30, converter 36 and inverter 34 can be reduced, as requested by the driver.

Dependent on the subsequent state of running, however, it may be possible that the driver requires torque exceeding the possible output torque value T(ECO) or the limit torque value T(0) by an accelerator operation, even when the driver has selected the economy mode. To meet such a demand, the following process is performed.

Figure 9:
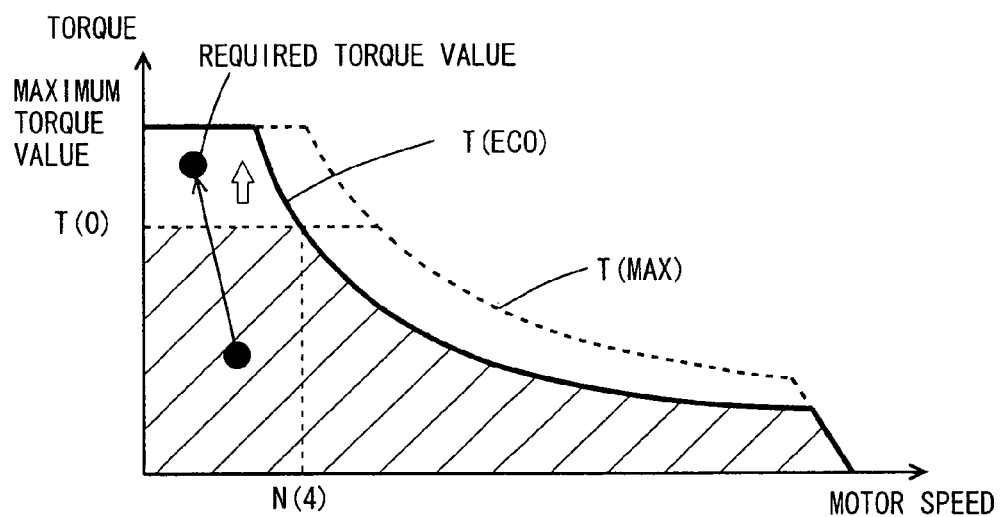

As a first process, if the required torque value remains larger than the limit torque value T(0) (YES at S112) and smaller than the possible output torque value T(ECO) (NO at S120), continuously for a prescribed time period, the upper limit of system voltage is maintained at the limit voltage value V(0), while the limit on the output torque is cancelled (S122). Therefore, the output toque is limited only by the possible output torque value T(ECO), as shown in FIG. 9. As a result, excessive torque exceeding the possible output torque value T(ECO) and the system loss by converter 36 can be reduced, while it is possible to cause motor 30 to output the torque as requested by the driver.

It is noted that the process is only a tentative process and, if the required torque value becomes smaller than the limit torque value T(0) thereafter (NO at S112, NO at S114), the limit on system voltage and the limit on output torque are resumed immediately (S116). Thus, priority is given again to prevention of excessive torque and reduction of system loss.

Figure 10:
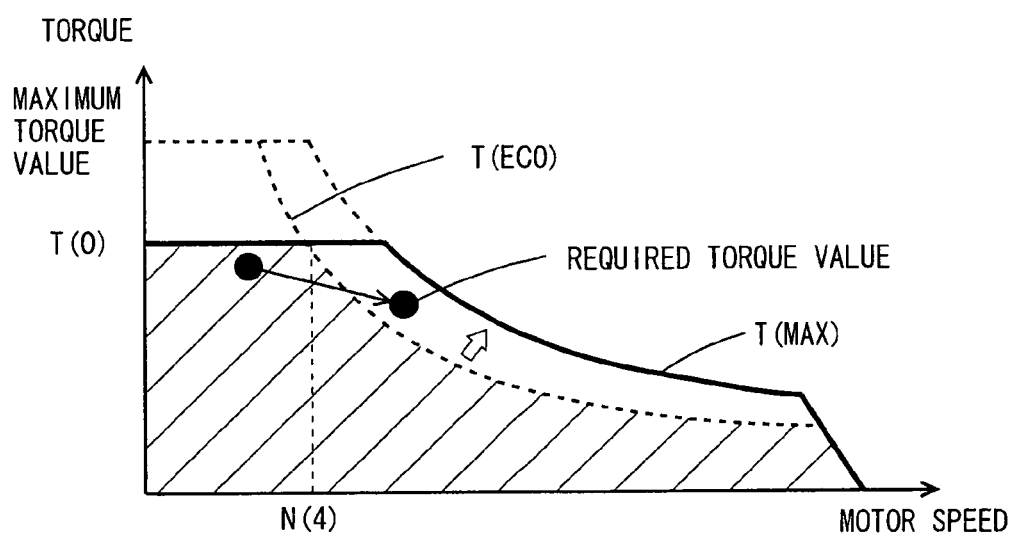

As a second process, if the required torque value is smaller than the limit torque value T(0) (NO at S112) and remains larger than the possible output torque value T(ECO) continuously for a prescribed time period (YES at S114), the upper limit of output torque is kept at the limit torque value T(0) while the limit on the system voltage is cancelled (S118). Therefore, the possible output torque is limited only by the limit torque value T(0), as shown in FIG. 10. Thus, excessive torque of motor 30 can be prevented and system loss by inverter 34 is reduced; while it is possible to cause motor 30 to output the torque as requested by the driver.

The second process is also a tentative process as is the first process, and if the required torque value becomes smaller than the possible output torque value T(ECO) thereafter (NO at S114), the limit on system voltage and the limit on output torque are resumed immediately (S116).

Figure 11:
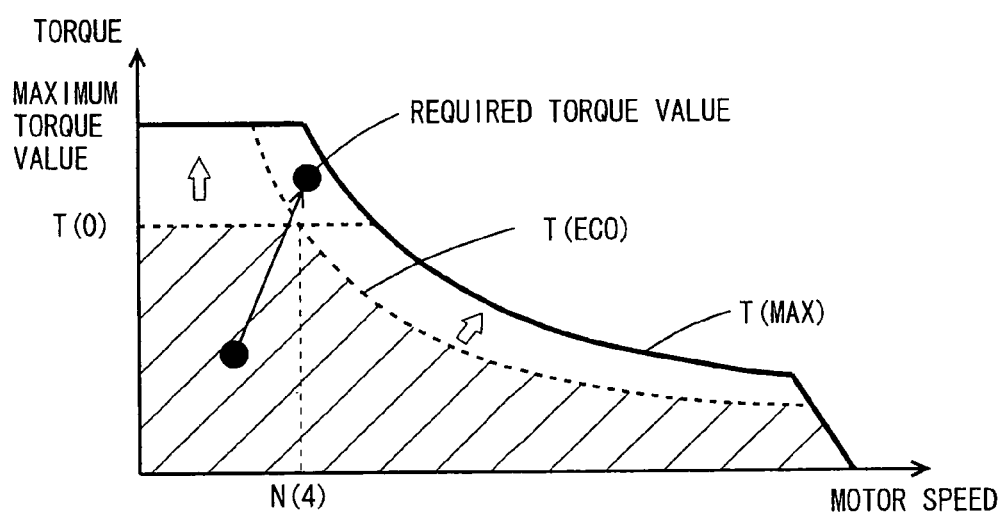

As a third process, if the required torque value remains larger than the limit torque value T(0) continuously for a prescribed time period (YES at S112) and larger than the possible output torque value T(ECO) for a prescribed time period (YES at S120), both the limit on output torque and the limit on system voltage are cancelled (S102). Consequently, the possible output torque value attains to the possible output torque value T(MAX), as shown in FIG. 11. As a result, it is possible to output the same torque as in the normal mode (NO at S100), and it is possible to cause motor 30 to output the torque as requested by the driver.

The third process is also a tentative process as are the first and second processes. If the required torque value becomes smaller than at least one of the limit torque value T(0) and the possible output torque value T(ECO) thereafter (NO at S112, NO at S120), at least one of the limit on output torque and the limit on system voltage is resumed immediately (S116, S118, S122).

As described above, according to the controller of the present embodiment, when the driver selects the economy mode, the system voltage and the output torque are both limited. Thereafter, based on the required torque value, the limit torque value and the possible output torque value with the limited voltage value, limit on either one of system voltage and output torque is cancelled, while the limit on the other is maintained. Therefore, it is possible to output the required torque value while either the loss by the converter or the loss by rotating electric machine is reduced. As a result, driving force required by the driver can be generated while unnecessary power consumption is reduced.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A controller for a vehicle including a power storage mechanism, a converter boosting electric power from said power storage mechanism, and a rotating electric machine that operates with the electric power from said converter, comprising:
a detecting unit for detecting which operation mode of a normal mode and an economy mode is selected by a driver of said vehicle; and
a control unit; wherein
said control unit limits boosting by said converter and limits output torque of said rotating electric machine, when selection of said economy mode is detected by said detecting unit, calculates a required torque value of said rotating electric machine, and based on said required torque value, cancels at least one of said limit on boosting and said limit on the output torque.

2. The controller according to claim 1, further comprising a speed detecting unit for detecting speed of said rotating electric machine; wherein
said control unit cancels at least one of said limits, based on the speed detected by said speed detecting unit, in addition to said required torque value.

3. The controller according to claim 2, wherein
said control unit determines whether or not said required torque value is larger than a threshold value, calculates a possible output torque value of said rotating electric machine when said boosting is limited, based on said detected speed, determines whether or not said required torque value is larger than said possible output torque value, and based on a result of determination as to whether said required torque value is larger than the threshold value and on a result of determination as to whether said required torque value is larger than said possible output torque value, cancels at least one of said limits.

4. The controller according to claim 3, wherein
said control unit cancels said limit on the output torque while maintaining said limit on boosting, if a state in which said required torque value is larger than said threshold value and smaller than said possible output torque value continues for a prescribed time period.

5. The controller according to claim 4, wherein
said control unit stops cancellation of said limit on the output torque and resumes said limit on the output torque, if said required torque value becomes smaller than said threshold value while said limit on said output torque has been cancelled.

6. The controller according to claim 3, wherein
said control unit cancels said limit on boosting while maintaining said limit on the output torque, if a state in which said required torque value is smaller than said threshold value and larger than said possible output torque value continues for a prescribed time period.

7. The controller according to claim 6, wherein
said control unit stops cancellation of said limit on boosting and resumes said limit on boosting, if said required torque value becomes smaller than said possible output torque value while said limit on boosting has been cancelled.

8. A controller for a vehicle including a power storage mechanism, a converter boosting electric power from said power storage mechanism, and a rotating electric machine that operates with the electric power from said converter, comprising:
detecting means for detecting which operation mode of a normal mode and an economy mode is selected by a driver of said vehicle;
control means for limiting boosting by said converter and limiting output torque of said rotating electric machine when selection of said economy mode is detected by said detecting means;
means for calculating a required torque value of said rotating electric machine; and
limit canceling means for canceling at least one of said limit on boosting and said limit on the output torque, based on said required torque value.

9. The controller according to claim 8, further comprising speed detecting means for detecting speed of said rotating electric machine; wherein
said limit canceling means includes means for canceling at least one of said limits, based on the speed detected by said speed detecting means, in addition to said required torque value.

10. The controller according to claim 9, wherein
said limit canceling means includes
first determining means for determining whether said required torque value is larger than a threshold value,
means for calculating a possible output torque value of said rotating electric machine when said boosting is limited, based on said detected speed,
second determining means for determining whether said required torque value is larger than said possible output torque value, and
canceling means for canceling at least one of said limits, based on a result of determination by said first determining means and a result of determination by said second determining means.

11. The controller according to claim 10, wherein
said canceling means includes means for canceling said limit on the output torque while maintaining said limit on boosting, if a state in which said required torque value is larger than said threshold value and smaller than said possible output torque value continues for a prescribed time period.

12. The controller according to claim 11, further comprising
means for stopping cancellation of said limit on the output torque and resuming said limit on the output torque by said limiting means, if said required torque value becomes smaller than said threshold value while said limit on said output torque has been cancelled by said canceling means.

13. The controller according to claim 10, wherein
said canceling means includes means for canceling said limit on boosting while maintaining said limit on the output torque, if a state in which said required torque value is smaller than said threshold value and larger than said possible output torque value continues for a prescribed time period.

14. The controller according to claim 13, further comprising
means for stopping cancellation of said limit on boosting by said canceling means and resuming said limit on boosting by said limiting means, if said required torque value becomes smaller than said possible output torque value while said limit on boosting has been cancelled by said canceling means.

\* \* \* \* \*